May 18, 1926.

A. J. CHARLTON 1,584,845

AUTOMOBILE WHEEL

Original Filed Dec. 2, 1922

Albert J Charlton _INVENTOR._

Patented May 18, 1926.

1,584,845

UNITED STATES PATENT OFFICE.

ALBERT J. CHARLTON, OF LOWDEN, IOWA.

AUTOMOBILE WHEEL.

Original application filed December 2, 1922, Serial No. 604,602. Divided and this application filed February 28, 1924. Serial No. 695,721.

My invention relates to improvements in wheels for automobiles upon which separable rims and tires are mounted.

The object of my invention is to provide an improved form of wheel usable in connection with a demountable rim.

I attain this object by the mechanism illustrated in the accompanying drawings, in which,—

Figure 2:
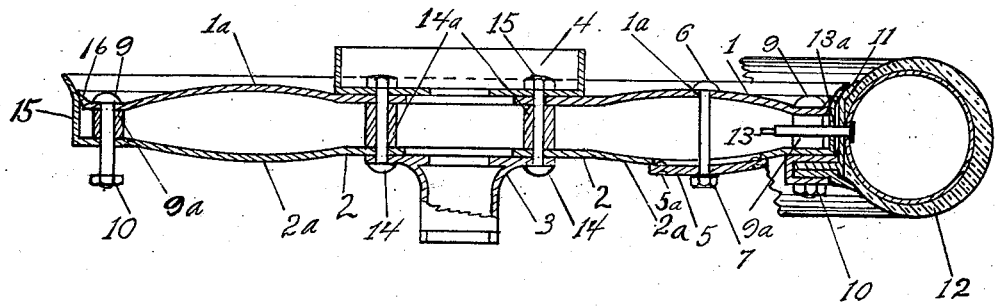
Figure 1:
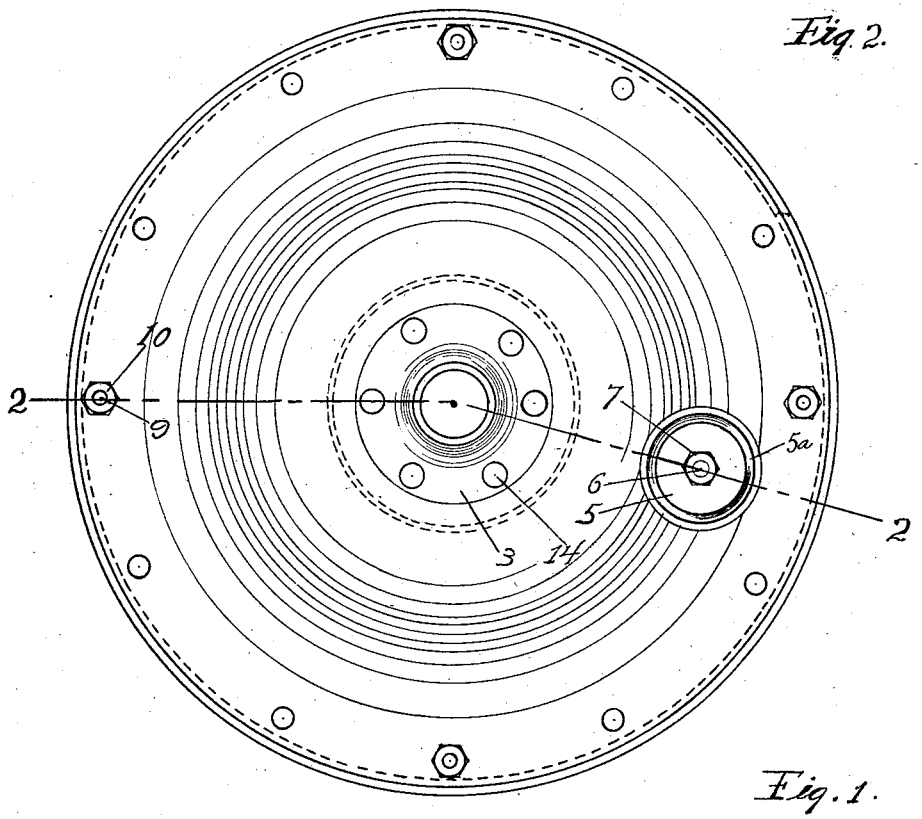

Figure 1 is a side elevation of a wheel embodying my improvement; Fig. 2 is a cross section of a metal wheel embodying my invention on the line 2—2 of Figure 1, showing a tire, 12, and demountable rim, 1, in section secured upon the right end to show the adaptation of my wheel to a demountable rim.

Similar numerals refer to similar parts throughout the several views.

My invention comprises a wheel having a metal hub, 3, of the ordinary form, with double metal discs, 1 and 2, secured thereto, the discs having outwardly extending concentric bulges, $1^a$ and $2^a$, between the hub, 3, and tread flange, 15, of the wheel, and the periphery of each disc being flanged to form a tread for the wheel, or rather, a seat for the rim, the tire itself properly forming the tread.

The outer disc, 2, has an extended flange, 15, extending inwardly approximately the width of the rim, 11, of the wheel and approximately at right angles to the plane of the disc, 2. The inner edge of the flange is bent slightly outwardly in a radial direction from the center of the wheel so as to provide a wedging action for the rim, 11, when placed thereon. The inner disc, 1, of the wheel is flanged at approximately right angles to the disc in the same direction as the outer disc. The flange, 16, of the inner disc, 1, is inclined outwardly in a radial direction from the center of the wheel slightly so as to afford a wedging action against the flange of the outer disc and secure a close fit between them and if desired, may be spot-welded or riveted to the flange, 15, of the outer disc, 2, but I prefer to construct these parts with a press fit which makes spot-welding unnecessary. The relative length of the flanges, 15 and 16, and the amount of contact between them, may be varied to suit the requirements of each particular case without departing from the principle of my invention. A brake drum, 4, is secured to the inner disc, 1, in the usual manner.

It is obvious that the use of the curved form of disc will allow a certain amount of elasticity which would not otherwise be obtained and the use of double plates allows a much lighter sheet of metal to be used for the plates and facilitates manufacture.

The discs are secured together by bolts, 14, which may also secure the hubs and brake drums to the discs. Tubular spacers, $14^a$, are inserted between the discs and are secured in position by the bolts, 14. The discs are also secured together near their edges by rim securing bolts, 9, which may be either in the form of bolts secured by nuts, 10, as shown in the drawings, or stud bolts as preferred.

Tubular spacers, $9^a$, are secured by the bolts, 9, between the outer edges of the discs.

In the disc 2, I cut a circular opening adjacent the valve stem, 3, of the tire, which may be closed by a circular plate, 5, secured in place by a bolt, 6, and a nut, 7. The plate, 5, is formed with a concentric bead, $3^a$, which seats against the edges of the opening covered by the plate, 5.

The valve stem, 13, is secured to the tire, 12, in the usual manner and projects through an opening, $13^a$, formed in the flange, 15, of the disc, 2.

In Figure 2 I have shown the particular form of demountable rim and locking devices claimed by me in patent application, Serial No. 604,602, of which this is a divisional application, but it is obvious that this form of wheel may be used with almost any of the standard forms of demountable rims and the lugs which lock the rims in position, may be secured upon the bolts, 9.

I claim:

1. A wheel comprising a hub, an outer disc having a circumferential flange formed integral therewith at right angles to the plane of the disc, an inner disc secured to the outer disc and having a relatively smaller flange extending in the same direction, and means securing the flange of the inner disc in close contact with the inner face of the flange of the outer disc.

2. A wheel comprising a hub, an outer disc having a circumferential flange formed integral therewith at right angles to the plane of the disc, an inner disc secured to the outer disc and having a relatively smaller flange extending in the same direction, and means for wedging the flange of the inner disc securely against the inner face of the flange of the outer disc.

3. A wheel comprising a hub, an outer disc having a circumferential flange formed integral therewith at right angles to the plane of the disc, an inner disc secured to the outer disc and having a relatively smaller flange extending in the same direction, means for wedging the flange of the inner disc securely against the inner face of the flange of the outer disc, and means for securing the disc in a fixed spaced relation to each other.

4. A wheel comprising a hub, an outer disc having a circumferential flange formed integral therewith at right angles to the plane of the disc, an inner disc secured to the outer disc and having a relatively smaller flange extending in the same direction, means for wedging the flange of the inner disc securely against the inner face of the flange of the outer disc, a hand hole formed in the outer disc with a suitable cover plate and means for securing the cover plate in position.

5. A wheel comprising a hub, an outer disc having a circumferential flange formed integral therewith at right angles to the plane of the disc, an inner disc secured to the outer disc and having a relatively smaller flange extending in the same direction, means for wedging the flange of the inner disc securely against the inner face of the flange of the outer disc, means for securing the discs in a fixed spaced relation to each other, a hand hole formed in the outer disc with a suitable cover plate and means for securing the cover plate in position.

6. A wheel comprising a hub, an outer disc having a circumferential flange formed integral therewith at right angles to the plane of the disc, an inner disc secured to the outer disc and having a relatively smaller flange extending in the same direction, and securely wedged within the flange of the outer disc.

In testimony whereof he affixes his signature.

ALBERT J. CHARLTON.